Nov. 7, 1961     C. H. SMITH     3,008,035
BUTT WELDING FIXTURE
Filed April 7, 1959     3 Sheets-Sheet 1
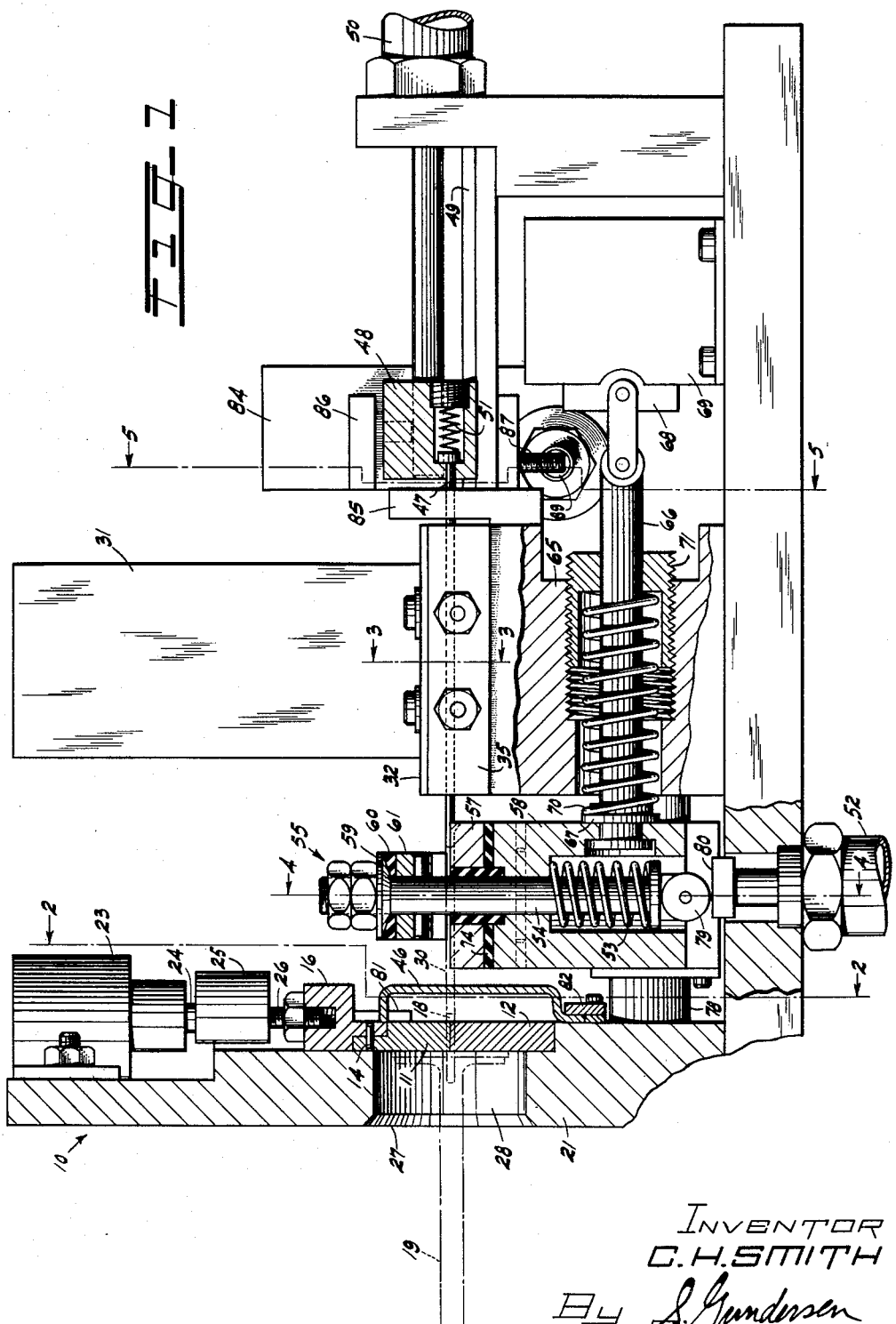
INVENTOR
C.H.SMITH
By S. Gundersen
ATTORNEY

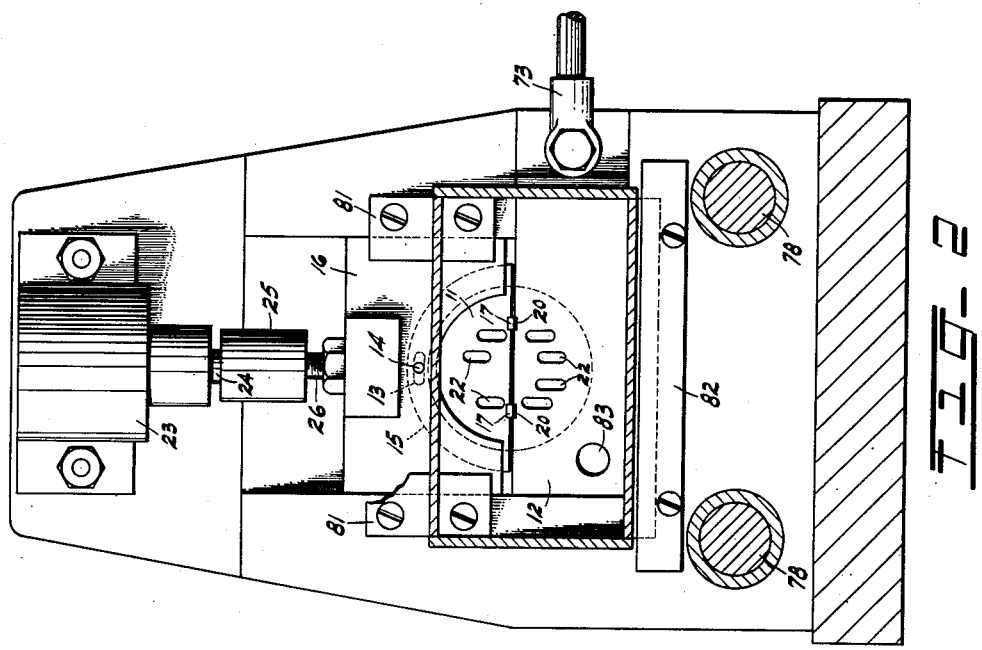

Nov. 7, 1961 C. H. SMITH 3,008,035
BUTT WELDING FIXTURE
Filed April 7, 1959 3 Sheets-Sheet 3
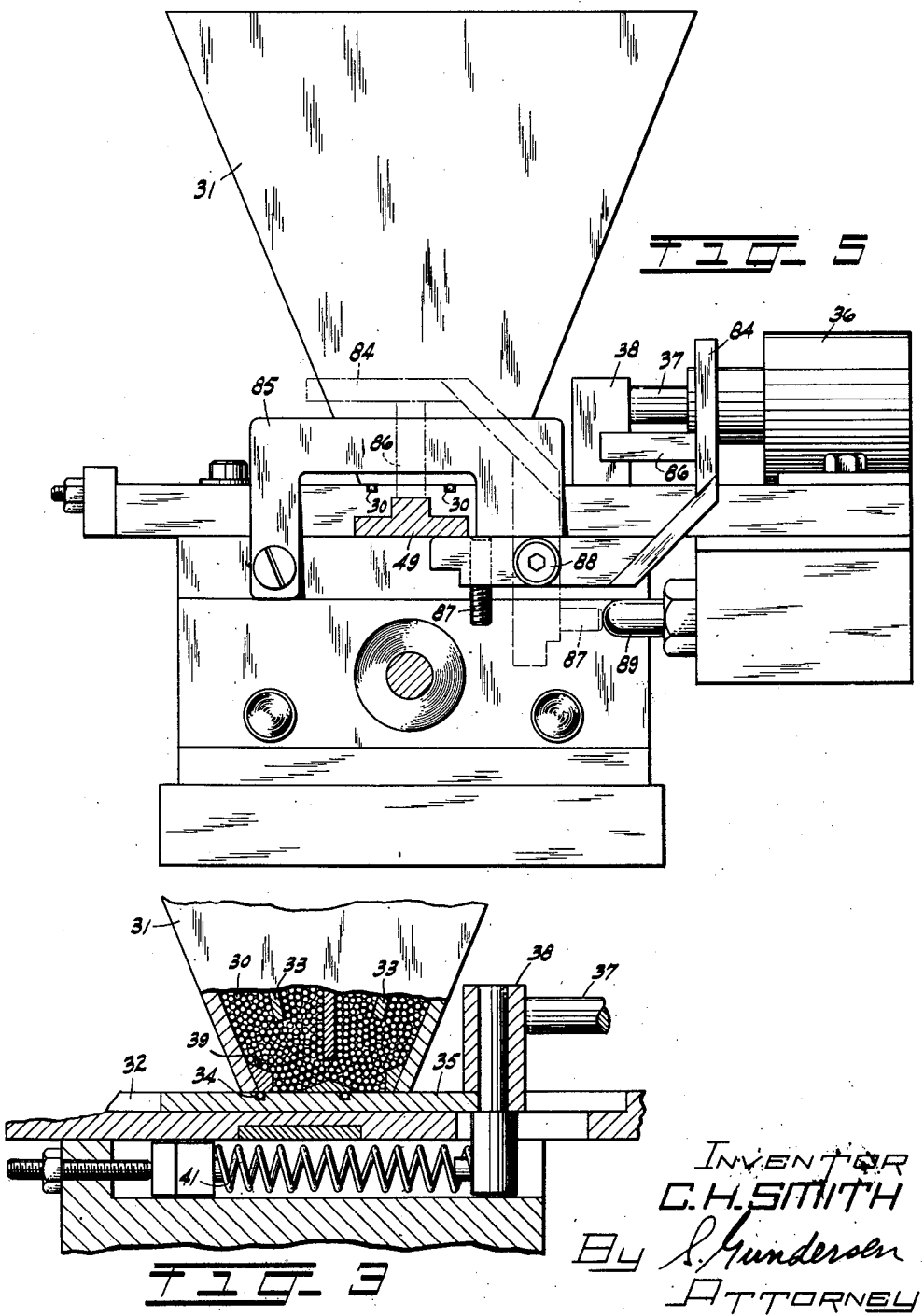
INVENTOR
C.H. SMITH
By S. Gundersen
ATTORNEY

United States Patent Office 3,008,035
Patented Nov. 7, 1961

3,008,035
BUTT WELDING FIXTURE
Cameron H. Smith, Center Valley, Pa., assignor to Western Electric Company, Incorporated, New York, N.Y., a corporation of New York
Filed Apr. 7, 1959, Ser. No. 804,683
2 Claims. (Cl. 219—101)

This invention relates to butt welding and particularly to a fixture which simultaneously butt welds two extension wires to preselected leads on the stem assembly of an electron tube.

In the fabrication of electron tubes, one of the operations involves the butt welding of two extension wires to preselected leads of the tube stem. Heretofore, the wires were welded individually to the leads and considerable time was consumed due to the insertion and removal of the stem from the fixture for each weld. Also, because of the very close tolerance required, unsatisfactory welds resulted whenever there was an inaccurate alignment of the stem leads with respect to the wire.

The principal object of this invention is to reduce considerably the time required for butt welding wires.

In a butt welding fixture constructed in accordance with the general features of the invention, a stem assembly holds the tube stem leads in a rigid position between a pair of electrode members and two extension wires are fed onto a shuttle through which they are advanced simultaneously onto a second electrode and supported thereon in butting relationship with the stem leads inside a chamber during the welding thereof.

An important feature of this invention is a self-aligning electrode for securely holding and making electrical contact to the two preselected stem leads regardless of electrode wear or any slight variation in size of the leads.

Another feature of the invention is a mechanism for simultaneously advancing two extension wires longitudinally into contact with the leads of the stem assembly.

Still another feature of the invention is a mechanism for clearing the machine of any wires which may have jammed, "burned off," or were not removed from the machine following the weld.

Other objects and a fuller understanding of the invention may be had by referring to the following description and claims, taken in conjunction with the accompanying drawing, in which:

FIG. 1 is a partial cross section side elevational view illustrating the invention, and;

FIG. 2 is a fragmentary cross sectional view taken along the line 2—2 of FIG. 1, and;

FIG. 3 is a fragmentary cross sectional view taken along the line 3—3 of FIG. 1, and;

FIG. 4 is a fragmentary cross sectional view taken along the line 4—4 of FIG. 1, and;

FIG. 5 is a fragmentary cross sectional view taken along the line 5—5 of FIG. 1.

With reference to the drawing, FIGS. 1 and 2 disclose a stem clamp unit 10 comprising an electrode having a movable upper member 11 and a fixed lower member 12. The upper member is substantially semi-circular in configuration having an arcuately shaped opening 13 in the upper central portion thereof for permitting arcuate movement on pin 14 in an arcuately shaped recesss 15 in electrode holder 16, pin 14 being secured in holder 16. The electrode member 11 has a pair of contacting portions 17 on the lower periphery for making contact with the leads 18, of an electron tube stem 19, positioned in a pair of laterally spaced grooves 20 on the upper periphery of the lower member 12 mounted to the support 21.

As shown in FIG. 2, the electrode members 11 and 12 have a plurality of apertures 22 for receiving the remaining leads of the stem, if any, when the leads 18 are inserted in the grooves 20. The leads 18 are securely clamped between the electrodes upon the activation of air cylinder 23 urging piston 24, connected to the electrode holder 16 by the adjustable sleeve 25 and screw 26, downwardly against the upper electrode member 11. Due to the free arcuate movement of the upper electrode member 11, substantially equal forces are applied automatically to both leads regardless of any slight size variation therein or uneven electrode wear of the contacting portions 17, and consequently the electrical contact resistance to both leads is substantially equalized to insure uniform welds.

As seen in FIG. 3, the cut wires 30, to be welded to the leads 18, are loaded in a hopper 31 mounted on the shuttle casing 32. The hopper has a pair of partitions 33 forming V-shaped compartments to insure that the wires fall into the respective slotss 34 of a shuttle 35 as it is reciprocated laterally thereunder. A shuttle air cylinder 36 is de-energized and piston 37, engaging shuttle projecting member 38 mounted on one end of the shuttle, retracts and releases simultaneously therewith a normally compressed spring 41 against the bottom portion of member 38 causing the shuttle to move from its normal feed position laterally whereby two wires fall into the slots when they are positioned under the hopper openings 39. The wires are transferred to the feeding position upon advancement of the piston 37 and spring 41 is compressed as the shuttle returns to its normal feed position. It is noted that the piston 37 can be connected to member 38 and spring 41 be removed so as to reciprocate the shuttle solely by use of the air cylinder attached to the member 38; however, it is preferred to utilize a spring so as to eliminate any mechanical rigidness in the sliding movement of the shuttle.

As illustrated in FIG. 1, when the wires 30 are in feed position, the slots 34 of the shuttle are in alignment with the grooves 20 of the lower electrode member 12 and consequently the wires and leads respectively are in alignment to each other. The wires simultaneously are advanced axially through the slots of the shuttle, under wire clamp unit 55 and inside an inert atmospheric chamber 46 into butting relationship with the leads 18 by a pair of elongated plungers 47 connected to a ram 48 urged forward on slide 49 when a wire feed air cylinder 50 is energized. Two small springs 51 behind each plunger 47 are compressed when the cut wires contact the ends of the stem leads to insure not only contact between the leads and wires but also to compensate for any lead or cut wire length variation.

When the wires 30 are urged towards the leads 18, under the force of the spring loaded plungers 47, a wire clamp air cylinder 52, shown in FIG. 4, is de-energized causing the normally compressed spring 53 around push rod 54 to release, and the clamping unit 55 affixed to the push rod moves downwardly therewith to lock the wires simultaneously in a pair of notches 56 located on the upper surface of the wire clamp electrode 57 mounted on a carriage 58. The spherical nut 59 and washer 60 are urged downwardly on the block 61 and plates 62 of the clamp unit 55 to equalize the clamping pressure on the wires. The wire feed cylinder 50 is retracted after the wires have been clamped to insure a continuous locking of the wires in butting relationship with the leads.

As seen in FIG. 1, a wire feed support 65 is connected to the wire clamp unit 55 by a shaft 66 extending through the unit and having one end locked into the carriage 58 by collar 67 and the other end conected to the armature 68 of the carriage return solenoid 69. A spring 70 surrounds that portion of the shaft 66 between the collar 67 and the adjusting screw 71 which may be turned in either direction so as to obtain the desired tension on the spring.

As seen in FIGS. 2 and 4, electrical current for the welding operation is provided from a transformer (not shown) to the fixture by secondary wiring 73 connected to the lower electrode member 12 and a connection 72 to the wire clamp electrode 57. The welding current is supplied at low voltage and consequently it is important to keep the impedance of the welding circuit very low. This is accomplished by providing a large area of contact which will have a low area of impedance and hence the rotary movement of the upper electrode member 11 within the arcuate recess 15 results in the maintenance of a low impedance path at a substantially constant low value. The wire electrode 57 is insulated from the carriage 58 by any suitable insulated material, such as phenol fiber 74, and by insulating jackets 76 and washers 77 around screws 75.

In operation, a tube stem is inserted through the opening 27 of the stem receiving unit 28 and a foot pedal (not shown) is depressed to actuate an automatic sequence drive (not shown) to start the operation of the fixture. The sequence driver, which may be a conventional multi-cam timer, electrically controls the air cylinders 23, 36, 50, 52 and solenoid 69 as follows:

First the air cylinder 23 is actuated moving electrode member 11 downwardly to clamp the leads 18 in welding position. Then the cut wire cylinder 50 is energized causing the ram 48 to move the plungers 47 axially against the wires 30 to advance them from the loaded shuttle 35 through the wire clamp unit 55 into butting relationship with the leads 18 inside the chamber 46. The wire clamp unit cylinder 52 is de-energized causing the normally open wire clamp unit 55 to drop on and lock the wires in the notches 56.

Then, the wire feed cylinder 50 is de-energized to retract the plungers 47 and simultaneously therewith the carriage return solenoid 69 is de-energized to release the tension on the spring 70 against the collar 67. Weld current is applied immediately following the retraction of the plungers and a conventional welding timer (not shown) determines the duration of the desired current flow. During this period, due to the tension release of spring 70 against collar 67, the carriage 58 moves to the left on shafts 78 towards the stem clamp unit 10 supplying sufficient welding pressure to displace the molten metal and provide the upset necessary for the butt weld. It is noted that electrical contact is assured through both wires by clamping them prior to retracting the wire feed cylinder.

A hold period is provided to allow cooling of the weld and during this time, the shuttle cylinder 36 is de-energized causing the shuttle 35 to move laterally and pass under the hopper 31 filling the slots 34 with wires and returning to its feed position just prior to the completion of the welding cycle. After the hold period has expired, the wire clamp air cylinder 52 is energized to release the wire clamp 55 and the stem clamp cylinder 23 is de-energized lifting the upper electrode 11 from the stem leads 18 at which time the operator removes the butt welded stem from the fixture. During the time that cylinder 52 is energized, the solenoid 69 is also energized causing the carriage to move freely to the right on the small roller 79, mounted on the bottom portion of the push rod 54, riding on piston platform 80. At the end of this movement, the sequence timer is stopped and the fixture is at rest wherein spring 70 is compressed, the stem clamp 10 is open, the carriage return solenoid 69 is energized, the shuttle 35 is in feed position and the plungers 47 are retracted ready to commence a new cycle.

As seen in FIG. 1, the welding takes place in the chamber 46 mounted on the stem clamp unit 10 at 81 and 82 and surrounding the electrode members 11 and 12. The chamber is flushed continuously with nitrogen, or the like, entering the chamber through tubing 83 and exiting through the electrode openings 22 so as to provide a neutral atmosphere which will not react with the materials being welded thereby preventing oxidation and resulting in the production of a clean weld. The chamber also acts as a shield and container for any spattering of molten metal occurring from the welding operation.

A clearing mechanism is provided to clear the fixture of any wires due to a poor weld, wire jam, or for some other reason whereby the wires were not removed from the machine following the weld. In the event the wires are jammed and cannot be readily removed from the fixture, a clearing mechanism, as seen in FIG. 5, may be utilized which consists of a substantially L-shaped lever 84, pivotally mounted on the ram stop bar 85 of wire feed support 65, and having a projecting member 86 affixed on the inner surface of one end and a set screw 87 threaded on the outer surface of the other end. The operator manually rotates the lever counterclockwise on its pivot 88 whereupon the projecting member 86 vertically engages the upper surface of the ram slide 49 and at the same time set screw 87 contacts the micro-switch 89 which energizes the wire feed cylinder 50. The plungers 47 are actuated to advance the wires from within the loaded shuttle forward to force out the defective wire(s) remaining in the wire clamp unit 55 from the fixture. However, being that projecting member 86 is positioned in the path of the ram 48, the movement of the plungers is limited and the position of the lead end of the wires used to force out the defective wires through the stem receiving unit 28 is just short of the entrance end of chamber 46. After the defective wires have been removed by the operator, the lever is rotated clockwise to its normal position. The subsequent butt weld is performed with the same procedure as previously described, the only difference being that the wires have been partially advanced towards the wire clamp unit 55.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A fixture for simultaneously butt welding a first pair of metal elements to a second pair, which comprises, a first electrode having an upper member and a lower member recessed to receive a first pair of elements, the members having corresponding contacting portions thereon in spaced relationship to each other, means for moving one of the members arcuately in a plane transverse to the elements to be welded so that the contacting portions hold said elements in rigid electrical contact with equalized pressure and in alignment with the second pair of elements, means for securely holding the first pair of elements between the two members, a second electrode mounted adjacent the first electrode for receiving the second pair of elements, means for advancing simultaneously the second pair into butting relationship with the first pair, means for clamping the second pair of elements in the second electrode, means for supplying electric current between the electrodes to butt weld simultaneously the first and second pair of elements, and means for activating the holding, advancing, clamping and current supplying means in a predetermined cyclic sequence.

2. A fixture for simultaneously butt welding a first pair of elements to a second pair, which comprises, a feeding member with a pair of notches therein for receiving the second pair, a first electrode having a pair of grooves on the upper surface thereof in alignment with the notches in feed position, a normally open clamp adjacent one side of the feeding member for securing the second pair of elements in the grooves, a second electrode having an upper and lower member for holding the first pair of elements, a ram adjacent the other side of the feeding member, a pair of elongated plungers mounted on the ram in alignment with the grooves and notches in feed position, driving means for moving the ram axially to insert the plungers in the notches and advance the second pair elements into butting relationship with the first pair, locking means for closing the clamp on the second pair, means for supplying electric current between the electrodes to butt weld simultaneously the first and second pair of elements, means for activating the driving, locking and current supplying means in a predetermined cyclic sequence, a member movable between a normally removed position and a position in the path through which the ram is advanced, and a switch operated by movement of the member to the position in the path to limit the forward movement of the ram sufficiently so that the plungers extend within the notches against the second pair of elements to force defective elements from the fixture.

References Cited in the file of this patent

UNITED STATES PATENTS

| | | |
|---|---|---|
| 804,045 | Rietzel | Nov. 7, 1905 |
| 1,180,096 | Woodrow et al. | Apr. 18, 1916 |
| 2,316,597 | Kershaw | Apr. 13, 1943 |
| 2,424,892 | Malke | July 29, 1947 |
| 2,765,395 | Kurth et al. | Oct. 2, 1956 |
| 2,806,934 | Andersson et al. | Sept. 17, 1957 |
| 2,843,724 | DeGaeta et al. | July 15, 1958 |